US007565176B2

(12) United States Patent  (10) Patent No.: US 7,565,176 B2
Garrett et al.  (45) Date of Patent: *Jul. 21, 2009

(54) DATA TRANSFER RATE DISPLAY SELECTION

(75) Inventors: Tara A. Garrett, San Marcos, CA (US); Erin Harnden, San Diego, CA (US)

(73) Assignee: Nokia Corporation, Espoo (FI)

( * ) Notice: Subject to any disclaimer, the term of this patent is extended or adjusted under 35 U.S.C. 154(b) by 204 days.

This patent is subject to a terminal disclaimer.

(21) Appl. No.: 11/652,175

(22) Filed: Jan. 10, 2007

(65) Prior Publication Data

US 2007/0111762 A1  May 17, 2007

Related U.S. Application Data

(62) Division of application No. 10/036,304, filed on Dec. 28, 2001, now Pat. No. 7,184,797.

(51) Int. Cl.
H04B 1/38 (2006.01)
H04M 1/00 (2006.01)

(52) U.S. Cl. .................. 455/566; 455/569.1; 455/557; 455/556.1; 455/414.1; 455/414.4; 455/419; 348/391.1; 348/396.1; 342/357.1; 342/357.06

(58) Field of Classification Search .............. 455/566, 455/569.1, 557, 517, 556.1, 414.1, 414.4, 455/419; 348/391.1, 396.1; 342/357.1, 357.06
See application file for complete search history.

(56) References Cited

U.S. PATENT DOCUMENTS 4,500,751 A  2/1985 Darland et al. ........... 379/93.17
5,027,212 A * 6/1991 Marlton et al. ............. 348/512
5,553,220 A  9/1996 Keene ....................... 345/520
5,594,467 A * 1/1997 Marlton et al. ............. 345/641
5,732,212 A  3/1998 Perholtz et al. ............. 709/224
5,859,879 A  1/1999 Bolgiano et al. ............ 370/330
5,903,261 A  5/1999 Walsh et al. ............. 715/500.1
5,930,341 A  7/1999 Cardillo et al. .......... 379/93.25
6,055,563 A  4/2000 Endo et al. ................. 709/203
6,144,848 A  11/2000 Walsh et al. ................ 455/419
6,161,932 A * 12/2000 Goto et al. ................. 351/208
6,175,569 B1  1/2001 Ellington et al. ............ 370/401
6,201,552 B1 * 3/2001 Itou et al. ................... 345/468
6,243,581 B1  6/2001 Jawanda .................. 455/432.2
6,249,689 B1  6/2001 Aizawa ...................... 455/566
6,366,951 B1 * 4/2002 Schmidt ..................... 709/208
6,389,039 B1  5/2002 Katinakis et al. ........... 370/474
6,405,049 B2  6/2002 Herrod et al. ............... 455/517
6,445,932 B1  9/2002 Soini et al. ................ 455/556.1
6,590,529 B2  7/2003 Schwoegler ............. 342/357.13
6,633,905 B1 * 10/2003 Anderson et al. ........... 709/219
6,643,371 B2  11/2003 Mager .................... 379/355.07
6,714,794 B1  3/2004 O'Carroll ................... 455/466
6,714,797 B1  3/2004 Rautila ..................... 455/552.1
6,745,025 B1  6/2004 Chow et al. ................ 455/417
6,874,029 B2  3/2005 Hutcheson et al. .......... 709/227
6,999,791 B1  2/2006 Ishikura et al. ............. 455/557
7,184,797 B2 * 2/2007 Burnhouse et al. .......... 455/566
7,349,956 B2 * 3/2008 Anderson et al. ........... 709/219
7,383,038 B2 * 6/2008 Koenck et al. .............. 455/418

* cited by examiner

Primary Examiner—Marceau Milord
(74) Attorney, Agent, or Firm—Harrington & Smith, PC

(57) ABSTRACT

A device for displaying data transfer rates on a display. The device includes a system for displaying the transfer rates in an alphanumeric mode or an alternative graphics mode; and a system for switching between displaying the transfer rates in the alphanumeric mode and the graphics mode.

12 Claims, 6 Drawing Sheets

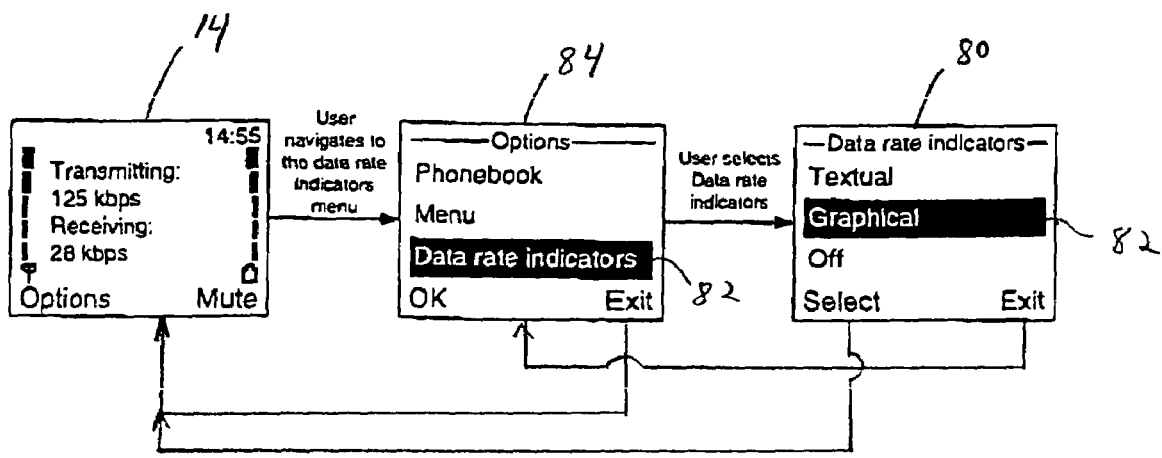

DATA TRANSFER RATE DISPLAY SELECTION

CROSS REFERENCE TO RELATED APPLICATION

This is a divisional patent application of U.S. patent application Ser. No. 10/036,304 filed Dec. 28, 2001, now U.S. Pat. No. 7,184,797.

BACKGROUND OF THE INVENTION

1. Field of the Invention

The present invention relates to communication devices capable of data and/or fax communication and, more particularly, to a system for displaying data transfer rates on a display.

2. Brief Description of Prior Developments

Traditional modems tend to indicate data transmission rates with blinking lights. Mobile communication devices, such as mobile phones, are now capable of acting as modems. Because these mobile communication devices include a more intrinsic display than those available on a traditional modem, there is an ability to portray more useful connection rate information to the user. In the past, Nokia Corp. has manufactured and sold mobile phones which indicate data transmission rates using graphical indicators.

There may be a desire by a first type of user to provide this communication rate information in an alphanumeric form. However, a second type of user might be overwhelmed by the technical nature of the information if communicated in an alphanumeric form. For such second type of user, a graphical display format, such as in the Nokia Corp. mobile phones, might be preferred. For a third type of user, there might be a desire to not display the data transfer rate at all. There is a desire to provide a system which can accommodate at least two and perhaps all three types of these users.

SUMMARY OF THE INVENTION

In accordance with one aspect of the present invention, a device for displaying data transfer rates on a display is provided. The device includes a system for displaying the transfer rates in an alphanumeric mode or an alternative graphics mode; and a system for switching between displaying the transfer rates in the alphanumeric mode and the graphics mode.

In accordance with another aspect of the present invention, a mobile radio communication device is provided having a display and a transceiver for transmitting and receiving data. The improvement comprises means for displaying a data transfer rate of data with the transceiver on the display in an alphanumeric format.

In accordance with another aspect of the present invention, a mobile radio communication device is provided comprising a transceiver, a controller coupled to the transceiver, and a display. The display is coupled to the controller. The controller is adapted to display on the display an indication of a data transfer rate of data by the transceiver. The communication device further comprises a system for inactivating display of the data transfer rate on the display while the transceiver is transmitting or receiving the data.

In accordance with one method of the present invention, a method of displaying a data transfer rate on a display is provided comprising steps of selecting, by a user, a data transfer rate display mode from a plurality of data transfer rate display modes; and displaying the data transfer rate on the display based upon the selected data transfer rate display mode.

In accordance with another method of the present invention, a method of changing displaying of a data transfer rate on a display of a portable communication device is provided comprising steps of selecting, by a user, to turn a displaying feature of the data transfer rate ON or OFF; and during data transfer by the portable communication device, a controller of the portable communication device, connected to the display, preventing the display from displaying the data transfer rate when the user has selected to turn the displaying feature OFF.

BRIEF DESCRIPTION OF THE DRAWINGS

The foregoing aspects and other features of the present invention are explained in the following description, taken in connection with the accompanying drawings, wherein:

FIG. 5 is a diagram of menus which can be displayed on the display of the portable communication device shown in FIG. 1 during data transfer.

DETAILED DESCRIPTION OF THE PREFERRED EMBODIMENTS

Figure 1:
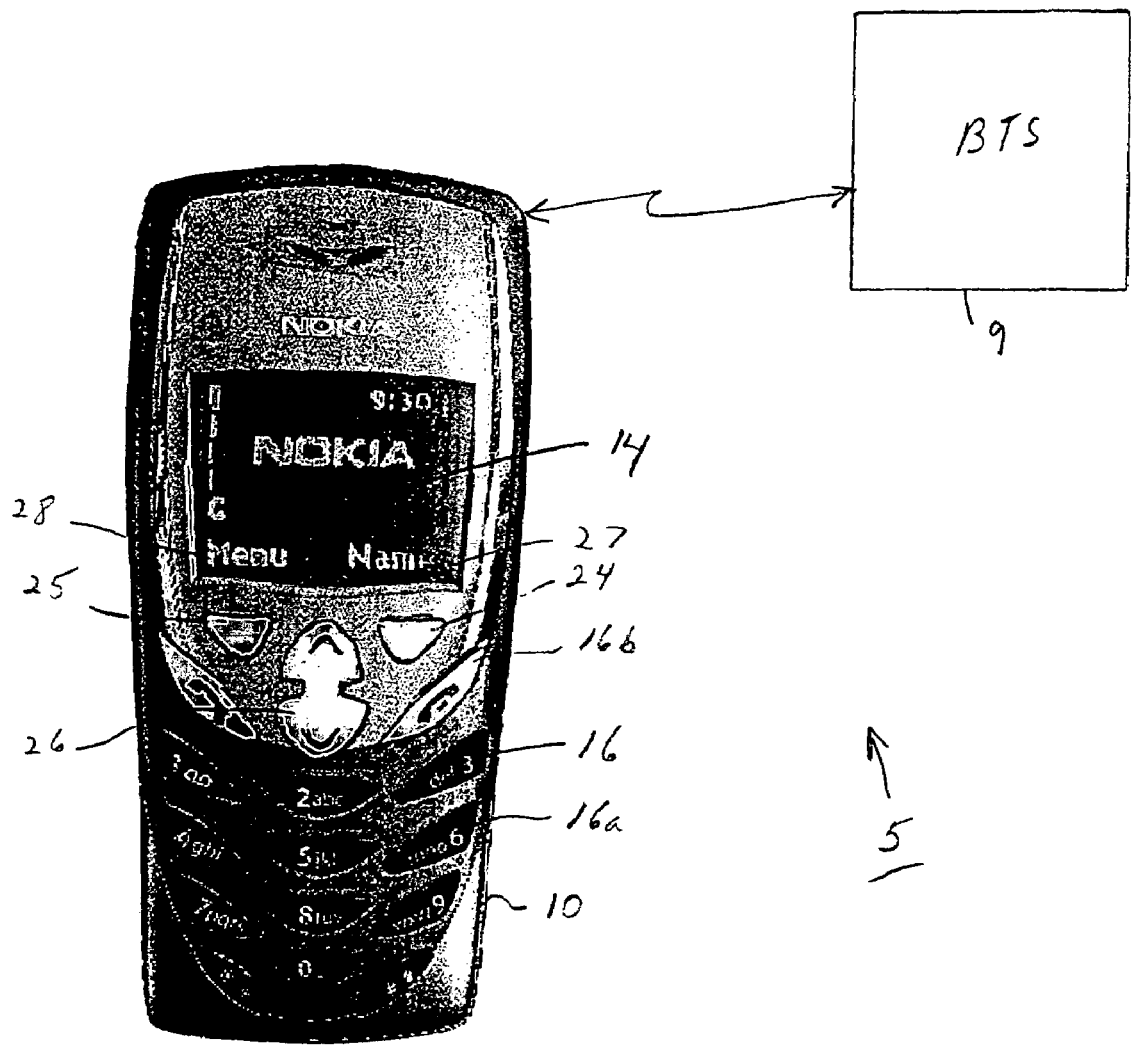
FIG. 1 is a diagram of a wireless communications system having a portable communication device incorporating features of the present invention shown operably coupled to a base station.

Referring to FIG. 1, there is shown a diagram of a portion of a wireless telecommunications system 5 having a mobile station or portable communication device 10 incorporating features of the present invention shown operably coupled by a wireless link to a base transceiver station (BTS) 9 of an exemplary network operator. Although the present invention will be described with reference to the embodiments shown in the drawings, it should be understood that the present invention can be embodied in many alternate forms of embodiments. In addition, any suitable size, shape or type of elements or materials could be used.

Figure 2:
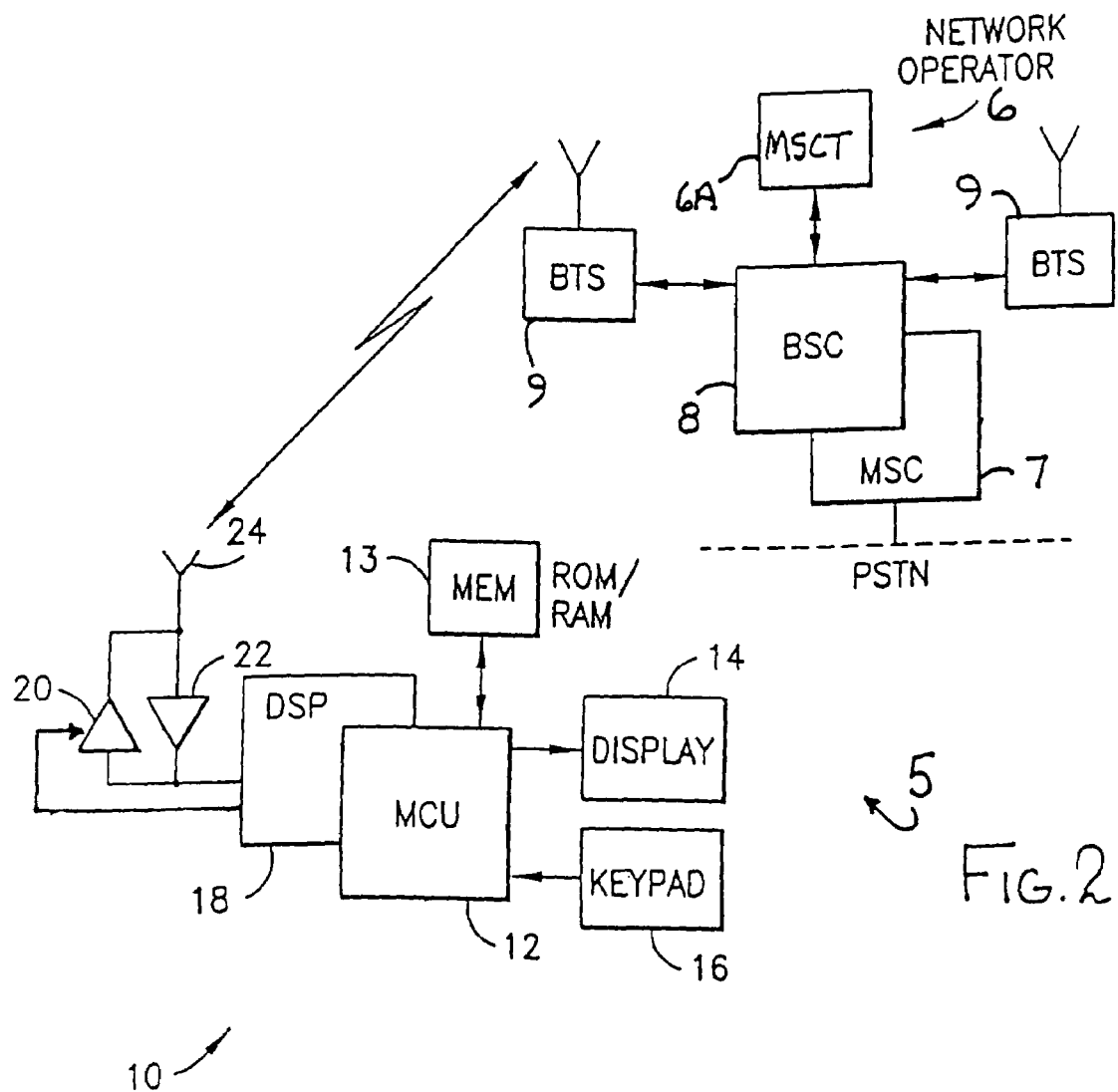
FIG. 2 is a block diagram of the wireless communications system shown in FIG. 1.

Referring also to FIG. 2, the network operator 6 generally comprises a mobile switching center (MSC) 7 for connecting to a telecommunications network, such as a public switched telephone network or PSTN, at least one base station controller (BSC) 8, and a plurality of base transceiver stations (BTS) 9 that transmit in a forward or downlink direction both physical and logical channels to the mobile station 10 in accordance with a predetermined air interface standard. A reverse or uplink communication path exists from the mobile station 10 to the network operator 6, and conveys mobile station originated access requests and traffic, such as voice and possible packet data traffic.

The air interface standard may conform to, for example, a Time Division Multiple Access (TDMA) air interface, or a Code Division Multiple Access (CDMA) air interface, or a Frequency Division Multiple Access (FDMA) air interface. In alternate embodiments, features of the present invention could be used with any suitable type of air interface standard. In an alternate embodiment, features of the present invention could be used with a wired communications system, such as a land line telephone system.

The network operator 6 can include a Message Service Center (MSCT) 6A that receives and forwards messages from the mobile station 10, such as Short Message Service (SAS) messages, or any wireless messaging technique including Email and supplementary data services. In an alternate embodiment, features of the present invention could be used with any suitable type of network operator system.

The mobile station 10 typically includes a micro control unit (MCU) 12 having an output coupled to an input of a display 14 and an input coupled to an output of a keyboard or keypad 16. The mobile station 10 may be considered to be a hand-held radio telephone, such as a cellular telephone or a personal communicator, and may have a microphone and a speaker for conducting voice communications. The mobile station 10 could also be contained within a card or module that is connected during use to another device. For example, the mobile station 10 could be contained within a PCMCIA or similar type of card or module that is installed during use with a portable data processor, such as a laptop or notebook computer, or even a computer that is wearable by the user.

The MCU 12 is assumed to include or be coupled to some type of memory 13, including a read only memory (ROM) for storing an operating program, as well as a random access memory (RAM) for temporarily storing require data, scratchpad data memory, received data packets and data packets prepared for transmission, etc. A separate removable SIM (not shown) can be provided as well. The SIM could store, for example, a preferred public land mobile network (PLMN) list and other subscriber related information.

The mobile station 10 also contains a wireless section that includes a digital signal processor (DSP) 18, or equivalent high-speed processor, as well as a wireless radio frequency (RF) transceiver comprising a transmitter 20 and a receiver 22. The transceiver is coupled to an antenna 24 for communication with the network operator 6. In an alternate embodiment, features of the present invention could be used with any suitable type of wireless communications device or mobile phone. As seen in FIG. 1, the keypad 16 includes an alphanumeric key section 16*a* and a control key section 16*b*. The control key section 16*b* includes two soft keys 24, 25 and an up/down scroll key 26. However, in alternate embodiments, the control key section could be comprised of any suitable number or type of keys or cursor control device. The two soft keys 24, 25 are located beneath two control indicator sections 27, 28 of the display 14. When one of the soft keys 24, 25 are depressed, the controller 12 can perform the function listed in the control indicator section 27, 28 located above the depressed soft key.

Figure 3A:
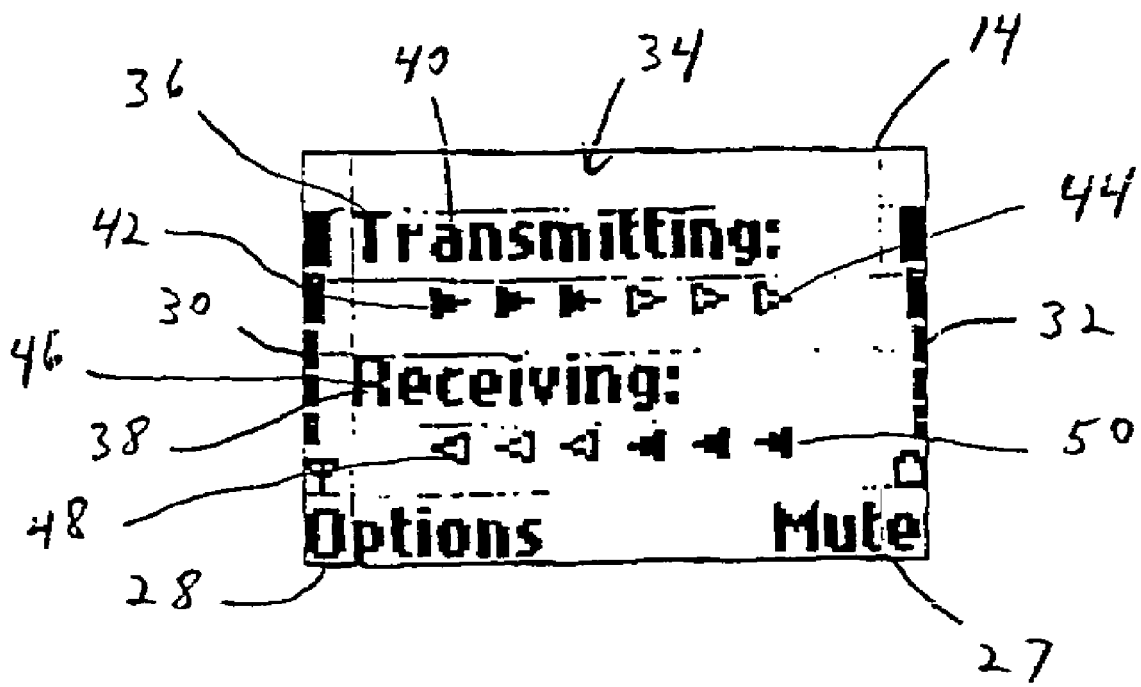
FIG. 3A is a diagram of a first type of information which can be displayed on the display of the portable communication device shown in FIG. 1.

Referring now also to FIG. 3A, a diagram of a display screen using a first mode of displaying information on the display 14 of the portable communication device 10 is shown. The display screen includes a graphical signal strength indicator 30, a graphical battery strength indicator 32, the two control indicator sections 27, 28 having control/menu features listed therein, and a data transfer rate indication 34. The data transfer rate indication 34 is displayed on the display 14 during data transfer between the phone 10 and the base station 9. The data transfer rate indication 34 is displayed on the display 14 to indicate to the user transmitting and/or receiving rates between the phone 10 and the base station 9.

In the embodiment shown, the data transfer rate indication 34 comprises two sections; a transmitting data transfer rate section 36 and a receiving data transfer rate section 38. However, in alternate embodiment, the data transfer rate indication 34 could comprise only a transmitting data transfer rate indication or only a receiving data transfer rate indication. In such an alternate embodiment, the data transfer rate indication 34 displayed on the display 14 could automatically switch between the transmitting and the receiving indications based upon the status of the phone 10 receiving or transmitting data.

In the embodiment shown in FIG. 3A, the transmitting data transfer rate section 36 generally comprises a text descriptor 40 associated with a graphical indicator 42. The text descriptor 40, in the embodiment shown, merely comprises the term "Transmitting:". However, in alternate embodiments, the text descriptor 40 could comprise any suitable type of descriptive text, or could comprise a graphical descriptor, or could comprise a combination of text and graphics. For example, in an alternate embodiment the text descriptor 40 could comprise the term "Sending:".

The graphical indicator 42, in the embodiment shown, comprises a plurality of sideward facing arrows or triangles 44. The arrows 44 comprise a darkened center or a non-darkened center. The totality of the arrows 44 (six in the embodiment shown) graphically indicate a maximum transmission rate between the phone 10 and the base station 9. The number of arrows having a darkened center indicate a percentage of the maximum transmission rate actually being used to transmit data from the phone 10 to the base station 9. In the illustration shown in FIG. 3A, three of the six arrows 44 have a darkened center. Thus, in the example illustrated, the phone 10 is transmitting at a data transfer rate of about fifty percent of its maximum transmission rate. The number of arrows having a darkened center and a non-darkened center will increase and decrease as the actual data transfer rate of transmitting data from the phone 10 to the base station 9 increases and decreases.

The receiving data transfer rate section 38 generally comprises a text descriptor 46 associated with a graphical indicator 48. The text descriptor 46, in the embodiment shown, merely comprises the term "Receiving:". However, in alternate embodiments, the text descriptor 46 could comprise any suitable type of descriptive text, or could comprise a graphical descriptor, or could comprise a combination of text and graphics.

The graphical indicator 48, in the embodiment shown, comprises a plurality of sideward facing arrows or triangles 50. The arrows 50 point in an opposite direction relative to the arrows 44. The arrows 50 comprise a darkened center or a non-darkened center. The totality of the arrows 50 (six in the embodiment shown) graphically indicate a maximum receiving rate between the phone 10 and the base station 9. The number of arrows having a darkened center indicate a percentage of the maximum receiving rate actually being used to transmit data to the phone 10 from the base station 9. In the illustration shown in FIG. 3A, three of the six arrows 50 have a darkened center. Thus, in the example illustrated, the phone 10 is receiving at a data transfer rate of about fifty percent of its maximum receiving rate. The number of arrows 50 having a darkened center and a non-darkened center will increase and decrease as the actual data transfer rate of receiving data by the phone 10 from the base station 9 increases and decreases.

The embodiment shown in FIG. 3A is intended to illustrate a graphics mode of displaying data transfer rates on the display 14. In alternate embodiments, any suitable type of graphics could be used in the graphical indicators 42, 48. In addition, any suitable graphics could be used to illustrate a change between data transfer maximum rate and actual rate. In addition to the graphics mode of display data transfer rates on the display 14, the phone 10 is also adapted to use an alphanumeric mode of displaying data transfer rates on the display 14.

Figure 3B:
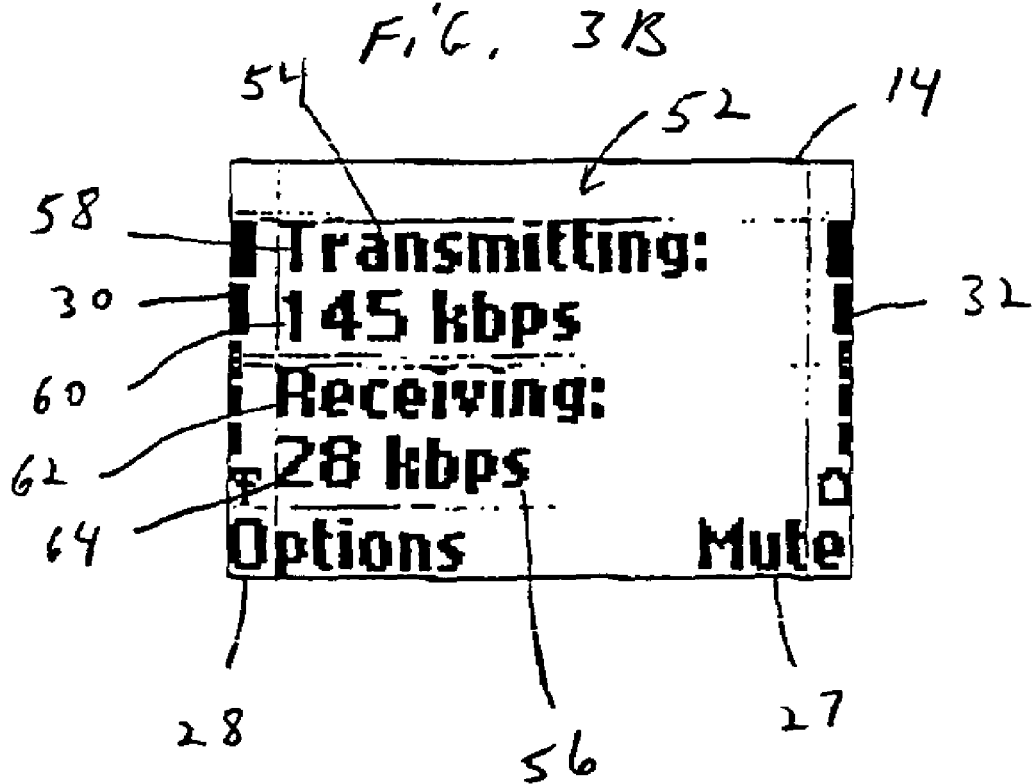
FIG. 3B is a diagram of a second type of information which can be displayed on the display.

Referring also to FIG. 3B, a diagram of a display screen comprising a second mode of displaying information on the display 14 of the portable communication device 10 is shown. The display screen includes the graphical signal strength indicator 30, the graphical battery strength indicator 32, the two control indicator sections 27, 28 having control/menu features listed therein, and the data transfer rate indication 52. The data transfer rate indication 52 is displayed on the display 14 during data transfer between the phone 10 and the base station 9. The data transfer rate indication 52 is displayed on the display 14 to indicate to the user transmitting and/or receiving rates between the phone 10 and the base station 9.

In the embodiment shown, the data transfer rate indication 52 comprises two sections; a transmitting data transfer rate section 54 and a receiving data transfer rate section 56. However, in alternate embodiment, the data transfer rate indication 52 could comprise only a transmitting data transfer rate indication or only a receiving data transfer rate indication. In such an alternate embodiment, the data transfer rate indication 52 displayed on the display 14 could automatically switch between the transmitting and the receiving indications based upon the status of the phone 10 receiving or transmitting data.

In the embodiment shown in FIG. 3B, the transmitting data transfer rate section 54 generally comprises a text descriptor 58 associated with an alphanumeric indicator 60. The text descriptor 58, in the embodiment shown, merely comprises the term "Transmitting:". However, in alternate embodiments, the text descriptor 58 could comprise any suitable type of descriptive text, or could comprise a graphical descriptor, or could comprise a combination of text and graphics.

The alphanumeric indicator 60 generally comprises a number followed by a rate descriptor. In the embodiment shown, the rate descriptor comprises the term "kbps" to indicate kilobits per second. Thus, in the illustration shown, the phone 10 is transmitting at 145 kilobits per second. The number in the alphanumeric indicator 60 will change to indicate the actual or approximate data transfer rate of data being transmitted from the phone 10 to the base station 9.

In the embodiment shown in FIG. 3B, the receiving data transfer rate section 56 generally comprises a text descriptor 62 associated with alphanumeric indicator 64. The text descriptor 62, in the embodiment shown, merely comprises the term "Receiving:". However, in alternate embodiments, the text descriptor 62 could comprise any suitable type of descriptive text, or could comprise a graphical descriptor, or could comprise a combination of text and graphics.

The alphanumeric indicator 64 generally comprises a number followed by a rate descriptor. In the embodiment shown, the rate descriptor comprises the term "kbps" to indicate kilobits per second. Thus, in the illustration shown, the phone 10 is receiving at 28 kilobits per second. The number in the alphanumeric indicator 64 will change to indicate the actual or approximate data transfer rate of data being received by the phone 10 from the base station 9.

The phone 10 could be adapted to display the data transfer rates in either only the alphanumeric mode (FIG. 3B) or only the graphics mode (FIG. 3A). However, in a preferred embodiment, the phone 10 is adapted to display the data transfer rates both in the alphanumeric mode or alternatively in the graphics mode. In a preferred embodiment, the phone 10 is adapted to allow the user to select the mode of display. However, in an alternate embodiment, the mode of display could be selected by a manufacturer and intended not to be changed by a user. This could allow a manufacturer to configure a same phone for different regions having different user preferences in those regions.

Figure 4:
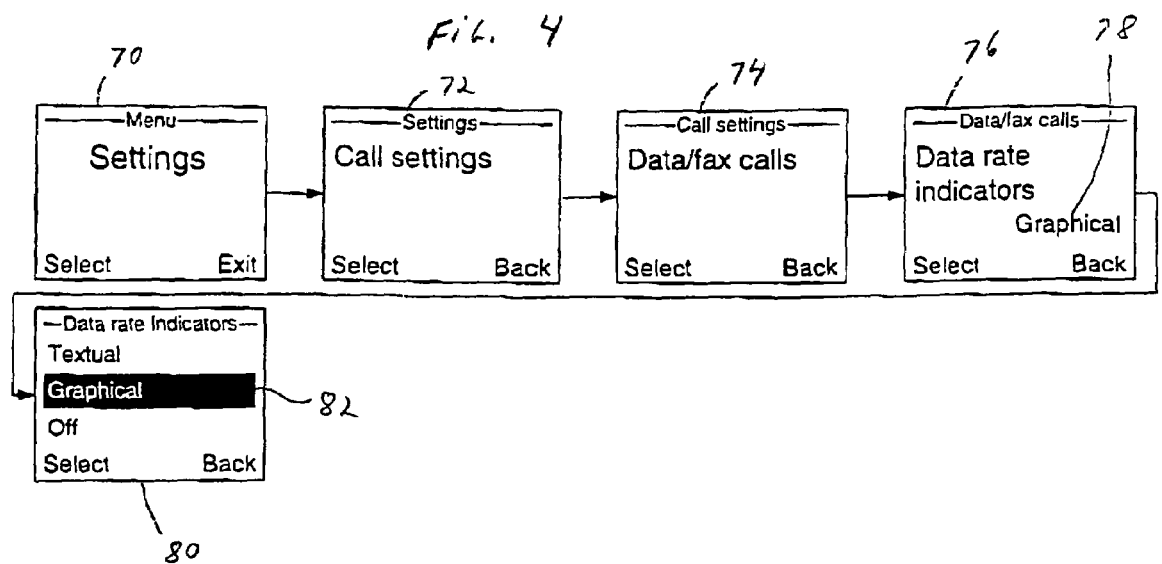
FIG. 4 is a diagram of menus which can be displayed on the display of the portable communication device shown in FIG. 1 for selecting a data transfer rate display mode.

Referring now also to FIG. 4, a series of menus or screens displayed on the display 14 for changing the data transfer rate display mode is shown. As shown in FIG. 1, the soft key 25 would initially be depressed to activate the menu function listed in the control indicator section 28 of the display 14. When entered into the menu function the user could depress the up/down scroll key 26 to scroll to the setting screen 70 shown in FIG. 4. The user could then depress the soft key 25 to select the settings menu. The user could then depress the up/down scroll key 26 to scroll to the call settings screen 72. The user could then depress the soft key 25 to select the call settings menu. The user could then depress the up/down scroll key 26 to scroll to the data/fax calls screen 74. The user could then depress the soft key 25 to select the data/fax calls menu. The user could then to depress the up/down scroll key 26 to scroll to the data rate indicators screen 76. The data rate indicators screen 76 preferably as an indicator section 78 which indicates the present data rate illustration mode. The user could then depress the soft key 25 to show the data rate indicators screen 80. The user could then use the up/down scroll key 26 to move the highlighter 82 to a desired one of the data rate illustration modes on the menu. By pressing the soft key 25 the user would select the mode highlighted by the highlighter 82.

The method and screens illustrated in FIG. 4 is only one type of method that could be employed to change the data transfer rate illustration mode. In an alternate embodiment, any suitable type of menus or screens for the user to select or changed the data transfer rate illustration mode could be provided.

In the embodiment shown in FIG. 4, the data rate indicators screen 80 includes a third data transfer rate illustration mode; an OFF or NONE mode. This type of mode prevents the data transfer rate from being displayed. The user can select the OFF mode. If the OFF mode is selected, then the data transfer rate indications 34 and/or 52 will not be displayed on the display 14 during data transfer. Thus, the user can select to turn the displaying feature of the data transfer rate ON or OFF.

The method and screens illustrated in FIG. 4 are generally intended to be used while the phone 10 is not in active communication with the base station 9. Referring now also to FIG. 5, a series of menus displayed on the display 14 for changing the data transfer rate display mode while the phone 10 is in active communication with the base station 9 is shown. When the phone 10 is in active communication with the base station 9, the control indicator section 28 of the display 14 does not list the menu function, but instead lists an "options" function. If the user depresses the soft the 25 the Options screen 84 will appear on the display 14. With the Options screen 84 displayed on the display 14, the user can depress the up/down scroll key 26 to move the highlighter 82 onto the data rate indicators selection. The user can then depress the soft key 25 to show the data rate indicators screen 80. The user can then depress the up/down scroll key 26 to move the highlighter 82 to the desired display mode. The user can then depress the soft key 25 to select the highlighted display mode and thereby return to the main screen with the selected data transfer rate display mode now being used to display the data transfer rate information on the display 14.

The method and screens illustrated in FIG. 5 is only one type of method that could be employed to change the data transfer rate illustration mode while the phone 10 is in active communication with the base station 9. In an alternate embodiment, any suitable type of menus or screens for the user to select or changed the data transfer rate illustration mode while the phone 10 is in active communication with the base station 9 could be provided. For example, in one type of alternate embodiment, during active communication with the base station the display 14 could comprise the "Menu" descriptor for the control indicator section 27 as shown in FIG. 1 and, the menus and screens illustrated in FIG. 4 could be used. Thus, in this alternate embodiment, the method illustrated in FIG. 5 might not be used and the method illustrated in FIG. 4 might be used for both situations; the first situation of when the phone is in active communication with the base station and, the second situation of when the phone is not in active communication with the base station. In alternate embodiments, the phone 10 could be adapted to allow the change in the data transfer rate illustration mode to be made only while the phone is in active communication with the base station, or only while the phone is not in active communication with the base station.

Figure 6A:
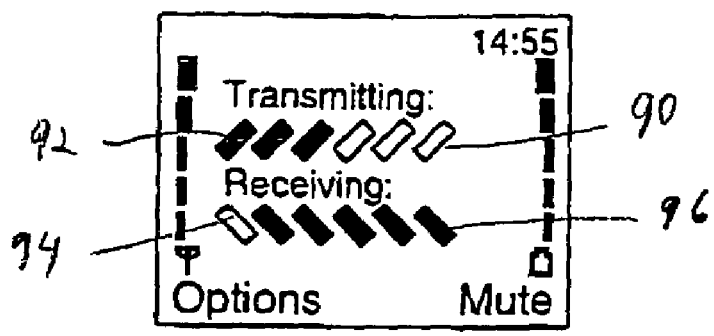
FIGS. 6A-6C are diagrams of alternate forms of display screens which can be displayed on the display of the portable communication device shown in FIG. 1.
Figure 6B:
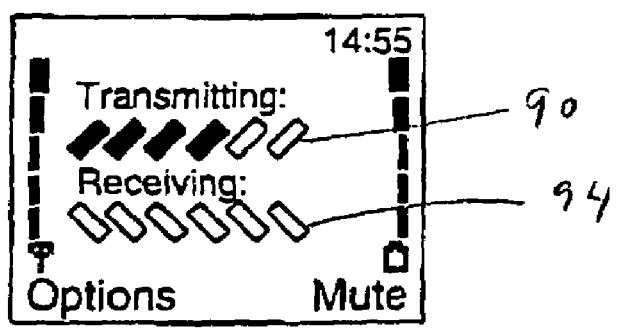
Figure 6C:
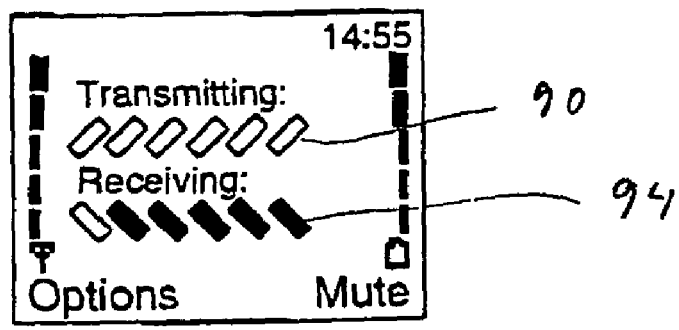

Referring now also to FIGS. 6A, 6B and 6C, an alternate embodiment of the graphical display mode is shown. In this alternate embodiment, the graphical indicator 90 comprises a plurality of slanted blocks 92. The blocks 92 comprise a darkened center or a non-darkened center. The totality of the blocks (six in the embodiment shown) graphically indicate a maximum transmission rate between the phone 10 and the base station 9. The number of blocks having a darkened center indicate a percentage of the maximum transmission rate actually being used to transmit data from the phone 10 to the base station 9. In the illustration shown in FIG. 6A, three of the six blocks 92 have a darkened center. Thus, in the example illustrated, the phone 10 is transmitting at a data transfer rate of about fifty percent of its maximum transmission rate. The number of blocks having a darkened center and a non-darkened center will increase and decrease as the actual data transfer rate of transmitting data from the phone 10 to the base station 9 increases and decreases.

The graphical indicator 94 comprises a plurality of slanted blocks 96. However, the slanted blocks 96 are slanted in an opposite direction relative to the slanted blocks 92. The blocks 96 comprise a darkened center or a non-darkened center. The darkened and non-darkened centers of the blocks 96 function the same way as the blocks 92 to indicate the actual reception rate versus maximum reception rate of data with the phone. Use of slanted blocks 92, 96 can allow for a greater plurality of indicators in each line. Although only six blocks are shown in each line, if the width of each line is diminished, more than six blocks can be provided.

FIG. 6A generally illustrates data being transmitted and received by the phone 10 at the same time. FIG. 6B generally illustrates transmitting of data by the phone 10 without data being received by the phone at the same time. FIGS. 6C generally illustrates receiving of data by the phone without data being transmitted by the phone at the same time. In the embodiment shown, the blocks 92 darken from left to right and the blocks 96 darken from right to left. However, they could darken in the same direction.

The present invention provides a mechanism whereby the user may select the type of data transmission rate display most appropriate for them. This mechanism also allows the user to shut OFF all data transmission rate displays, in view the standard in-call user interface using active data (or fax) calls. In the alphanumeric display mode, numerical data rates can indicate to the users their current data rate in exact numbers. However, for some less technical users, this information may be overwhelming. Graphical data indicators, on the other hand, are less intimidating for the user, but do not give exact information about the current data rate. Instead, they only provide information about where the current rate falls in relation to the peak rate. The present invention allows the user to choose the display mode based upon their own level of technical information desired. This provides an advantage of greater flexibility and personalization of the telephone's operation for the specific user.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A portable electronic device adapted to communicate by a wireless connection, the device comprising:
   a display; and
   a user interface adapted to allow a user to select a data transfer rate display mode, between an alphanumeric mode or an alternative graphics mode, for displaying a data transfer rate on the display.

2. A portable electronic device as in claim 1 wherein the user interface comprises a soft key.

3. A portable electronic device as in claim 1 wherein the user interface comprises a scroll key.

4. A portable electronic device as in claim 1 wherein the user interface comprises a menu screen displayed on the display to allow a user to select between the alphanumeric mode and the alternative graphics mode.

5. A portable electronic device as in claim 1 wherein the user interface comprises a menu screen displayed on the display to allow a user to select an OFF setting for not displaying the data transfer rate on the display.

6. A portable electronic device as in claim 1 wherein the device comprises a hand-held mobile telephone.

7. A portable electronic device as in claim 1 wherein the device comprises a receiver and the data transfer rate is the rate of information received by the receiver.

8. A portable electronic device as in claim 1 wherein the device comprises a transmitter and the data transfer rate is the rate of information transmitted by the transmitter.

9. A program storage device readable by a machine, tangibly embodying a program of instructions executable by the machine for performing operations to display a data transfer rate on a display, the operations comprising:
   determining a data transfer rate display mode comprising determining a data transfer rate display mode selected by a user from a plurality of data transfer rate display modes; and
   displaying the data transfer rate on the display based upon the determined data transfer rate display mode.

10. A portable electronic device comprising:
    a display;
    a communications section comprising a receiver and/or a transmitter; and
    a controller coupled to the display and the communications section, wherein the controller comprises a system for displaying a data transfer rate of the communications section on the display comprising:
      a system for displaying the transfer rate in an alphanumeric mode or an alternative graphics mode; and
      a system for switching between displaying the transfer rate in the alphanumeric mode and the graphics mode.

11. A portable electronic device as in claim 10 wherein the device comprises a mobile telephone.

12. A portable electronic device as in claim 10 wherein the device comprises a hand-held, mobile electronic device.

* * * * *